(12) United States Patent  
Chen et al.

(10) Patent No.: US 6,602,625 B1
(45) Date of Patent: Aug. 5, 2003

(54) FUEL CELL WITH DUAL END PLATE HUMIDIFIERS

(75) Inventors: Xuesong Chen, Brampton (CA); David Frank, Scarborough (CA)

(73) Assignee: Hydrogenics Corporation, Mississauga (CA)

( * ) Notice: Subject to any disclaimer, the term of this patent is extended or adjusted under 35 U.S.C. 154(b) by 117 days.

(21) Appl. No.: 09/592,645

(22) Filed: Jun. 13, 2000

(51) Int. Cl.[7] ................................................ H01M 8/00
(52) U.S. Cl. .............................. 429/13; 429/17; 429/19; 429/22; 429/24; 429/26; 429/34; 429/12
(58) Field of Search ............................. 429/12, 17, 19, 429/22, 24, 26, 13, 34

(56) References Cited

U.S. PATENT DOCUMENTS

| | | |
|---|---|---|
| 5,200,278 A | 4/1993 | Watkins et al. ............... 429/24 |
| 5,382,478 A | 1/1995 | Chow et al. |
| 6,106,964 A * | 8/2000 | Voss et al. ..................... 429/20 |
| 6,207,312 B1 * | 3/2001 | Wynne et al.1 ............... 429/34 |
| 6,284,399 B1 * | 9/2001 | Oko et al. ..................... 429/19 |

* cited by examiner

Primary Examiner—Patrick Ryan
Assistant Examiner—Angela J. Martin
(74) Attorney, Agent, or Firm—Bereskin & Parr

(57) ABSTRACT

In a fuel cell, a humidification cell stack is provided at each end of the fuel cell as an extension of the fuel cell. The cells of each of the two humidification cell stacks can be structurally similar to and can include the same membrane as the individual cells of the fuel cell stack. Flows of fuel and oxygen are then arranged to pass through each of the two humidification cell stacks for exchange of moisture. Preferably, the humidification section at one end of the fuel cell stack provides moisture exchange between incoming fuel and discharged oxygen, while the humidification section at the other end of the fuel cell stack, provides moisture exchange between the incoming oxygen and the discharged fuel. This arrangement is expected to enhance uniform operating conditions within the fuel cell stack itself, so as to ensure optimum operating conditions throughout the fuel cell stack.

13 Claims, 2 Drawing Sheets

FUEL CELL WITH DUAL END PLATE HUMIDIFIERS

FIELD OF THE INVENTION

Figure 1:
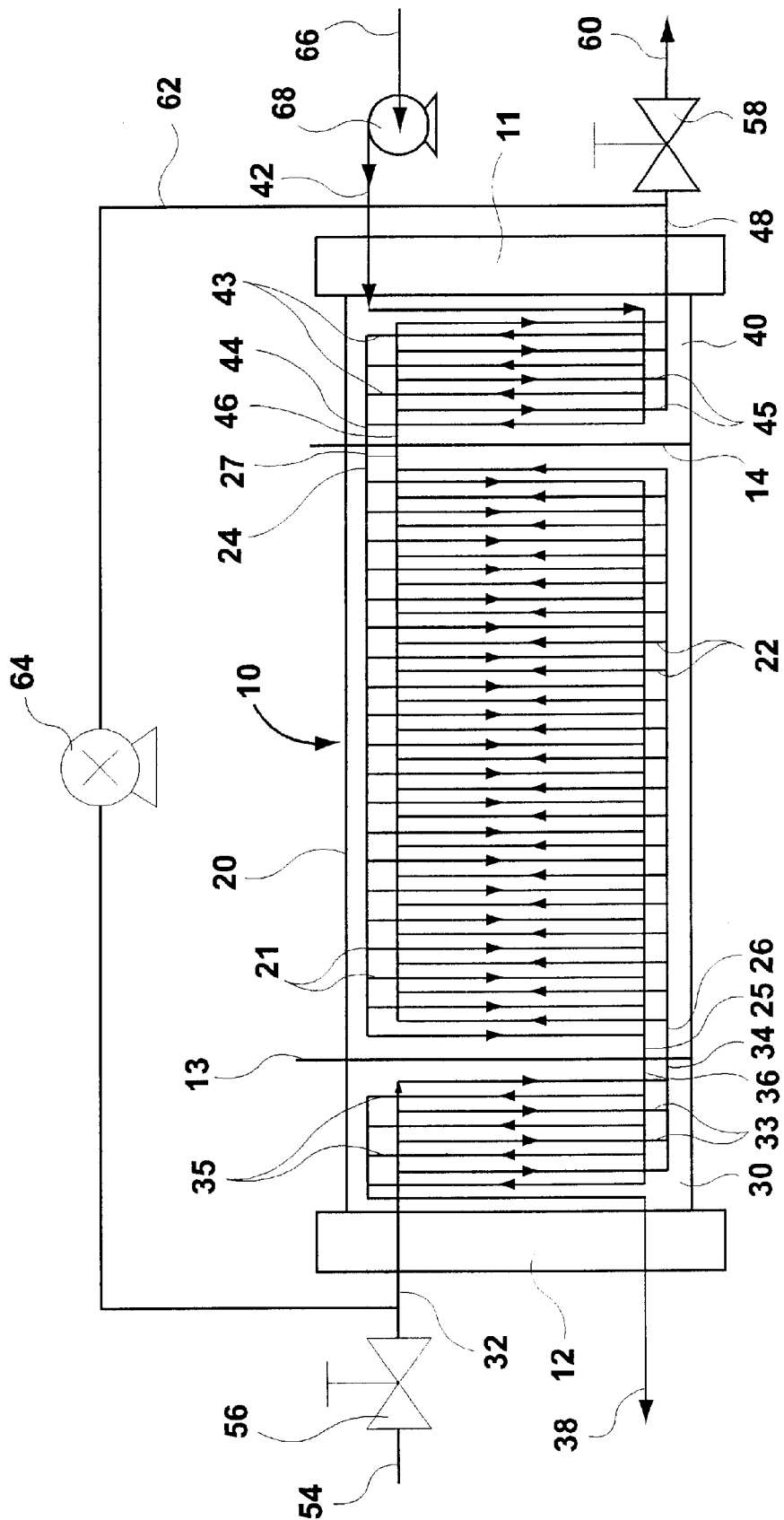

This invention relates to electrochemical fuel cells. More particularly, this invention relates to electrochemical fuel cells which employ hydrogen as a fuel and receive an oxidant to convert the hydrogen to electricity and heat, and which utilize a proton exchange membrane as the electrolyte.

BACKGROUND OF THE INVENTION

Generally, a fuel cell is a device which converts the energy of a chemical reaction into electricity. It differs from a battery in that the fuel cell can generate power as long as the fuel and oxidant are supplied.

A fuel cell produces an electromotive force by bringing the fuel and oxidant into contact with two suitable electrodes and an electrolyte. A fuel, such as hydrogen gas, for example, is introduced at a first electrode where it reacts electrochemically in the presence of the electrolyte and catalyst to produce electrons and cations in the first electrode. The electrons are circulated from the first electrode to a second electrode through an electrical circuit connected between the electrodes. Cations pass through the electrolyte to the second electrode. Simultaneously, an oxidant, typically air, oxygen enriched air or oxygen, is introduced to the second electrode where the oxidant reacts electrochemically in presence of the electrolyte and catalyst, producing anions and consuming the electrons circulated through the electrical circuit; the cations are consumed at the second electrode. The anions formed at the second electrode or cathode react with the cations to form a reaction product. The first electrode or anode may alternatively be referred to as a fuel or oxidizing electrode, and the second electrode may alternatively be referred to as an oxidant or reducing electrode. The half-cell reactions at the two electrodes are, respectively, as follows:

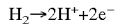

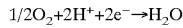

The external electrical circuit withdraws electrical current and thus receives electrical power from the cell. The overall fuel cell reaction produces electrical energy which is the sum of the separate half-cell reactions written above. Water and heat are typical by-products of the reaction.

In practice, fuel cells are not operated as single units. Rather, fuel cells are connected in series, stacked one on top of the other, or placed side by side. A series of fuel cells, referred to as fuel cell stack, is normally enclosed in a housing. The fuel and oxidant are directed through manifolds to the electrodes, while cooling is provided either by the reactants or by a cooling medium. Also within the stack are current collectors, cell-to-cell seals and insulation, with required piping and instrumentation provided externally of the fuel cell stack. The stack, housing, and associated hardware make up the fuel cell module.

Fuel cells may be classified by the type of electrolyte, either liquid or solid. The present invention is primarily concerned with fuel cells using a solid electrolyte, such as a proton exchange membrane (PEM). The PEM has to be kept moist with water because the available membranes will not operate efficiently when dry. Consequently, the membrane requires constant humidification during the operation of the fuel cell, normally by adding water to the reactant gases, usually hydrogen and air.

The proton exchange membrane used in a solid polymer fuel cell acts as the electrolyte as well as a barrier for preventing the mixing of the reactant gases. An example of a suitable membrane is a copolymeric perfluorocarbon material containing basic units of a fluorinated carbon chain and sulphonic acid groups. There may be variations in the molecular configurations of this membrane. Excellent performances are obtained using these membranes if the fuel cells are operated under fully hydrated, essentially water-saturated conditions. As such, the membrane must be continuously humidified, but at the same time the membrane must not be over humidified or flooded as this degrades performances. Furthermore, the temperature of the fuel cell stack must be kept above freezing in order to prevent freezing of the stack.

Cooling, humidification and pressurization requirements increase the cost and complexity of the fuel cell, reducing its commercial appeal as an alternative energy supply in many applications. Accordingly, advances in fuel cell research are enabling fuel cells to operate without reactant conditioning, and under air-breathing atmospheric conditions while maintaining usable power output.

The current state-of-the-art in fuel cells, although increasingly focusing on simplified air-breathing, atmospheric designs, has not adequately addressed operations in sub-zero temperatures, which requires further complexity of the design. For instance, heat exchangers and thermal insulation are required, as are additional control protocols for startup, shut-down, and reactant humidifiers.

Where a solid polymer proton exchange membrane (PEM) is employed, this is generally disposed between two electrodes formed of porous, electrically conductive material. The electrodes are generally impregnated or coated with a hydrophobic polymer such as polytetrafluoroethylene. A catalyst is provided at each membrane/electrode interface, to catalyze the desired electrochemical reaction, with a finely divided catalyst typically being employed. The membrane electrode assembly is mounted between two electrically conductive plates, each of which has at least one flow passage formed therein. The fluid flow conductive fuel plates are typically formed of graphite. The flow passages direct the fuel and oxidant to the respective electrodes, namely the anode on the fuel side and the cathode on the oxidant side. The electrodes are electrically coupled in an electric circuit, to provide a path for conducting electrons between the electrodes. In a manner that is conventional, electrical switching equipment and the like can be provided in the electric circuit. The fuel commonly used for such fuel cells is hydrogen, or hydrogen rich reformate from other fuels ("reformate" refers to a fuel derived by reforming a hydrocarbon fuel into a gaseous fuel comprising hydrogen and other gases). The oxidant on the cathode side can be provided from a variety of sources. For some applications, it is desirable to provide pure oxygen, in order to make a more compact fuel cell, reduce the size of flow passages, etc. However, it is common to provide air as the oxidant, as this is readily available and does not require any separate or bottled gas supply. Moreover, where space limitations are not an issue, e.g. stationary applications and the like, it is convenient to provide air at atmospheric pressure. In such cases, it is common to simply provide channels through the stack of fuel cell for flow of air as the oxidant, thereby greatly simplifying the overall structure of the fuel cell assembly. Rather than having to provide a separate circuit for oxidant, the fuel cell stack can be arranged simply to provide a vent, and possibly, some fan or the like to enhance air flow.

There are various applications for which humidification of fuel cells poses particular problems and challenges. For example, operation of fuel cells in mobile vehicles usually means that there is no readily available supply of water for humidifying incoming oxidant and fuel streams. It is usually undesirable to have to provide water to a vehicle for this purpose and also to have to carry the excess weight of the water around in the vehicle. In contrast, for stationary applications, providing a supply of water for humidification is usually quite possible.

However, there also some stationary applications for which humidification is not straightforward. For example, fuel cells are often used to provide power supplies to remote sensing equipment, in locations where water may not be readily available. Additionally, such remote use of fuel cells often occurs at locations with extreme climatic conditions. Thus, it has been known to use fuel cell stacks in the Antarctic regions and the like, for providing supply to scientific instruments. It is simply not realistic to provide a separate supply of water for humidification, because of the problems of preventing freezing of the water supply. Additionally, ambient air used as an oxidant is excessively dry, so that humidification is more critical than when using relatively moist air at more moderate temperatures. It will be appreciated that similar extreme conditions can be found in desert locations and the like.

PEM fuel cells commonly operate at an elevated temperature. However, a common problem with many fuel cell stacks is that it is difficult to maintain uniform operating conditions throughout the stack. More particularly, central cells in the stack can be maintained at uniform conditions, but cells at either end of the stack tend to operate at less than optimum conditions. As a result, frequently the end cells have a tendency to become flooded, and as a consequence to have decreased efficiency and performance.

A further consideration is that, for many applications, it is desirable that an overall fuel cell power installation be compact and include a minimum number of components. Thus, the inclusion of a separate humidification section or unit is, in general, undesirable, as it leads to additional complexity and a further component to be provided in the overall assembly.

What the present inventors have realized is that the problems identified humidification sections integral with a fuel cell stack and having a construction broadly similar to that of the fuel cell stack itself.

SUMMARY OF THE INVENTION

In Proton Exchange Membrane (PEM) fuel cells, both the fuel and oxidant streams need to be humidified in order to enhance the fuel cell performance. For good performance, the membrane needs to be kept at a desired level of humidity. At the same time, the electrochemical reaction between the fuel and the oxidant generates water during power generation, and the resultant water vapor needs to be discharged from the cell. Because of the nature of the PEM fuel cells, the production water is largely entrained in the discharged oxidant flow.

The present inventors have realized that it is possible to recover moisture from the discharged oxidant stream, by passing it across one side of a membrane, with a fuel stream passing on the other side of the membrane. Similarly, the discharged fuel stream can include some moisture and could be passed on one side of another membrane, with the incoming oxidant stream passing on the other side of that other membrane. As the inlet fuel and oxidant streams are dry and the outgoing fuel and oxidant streams are wet or humid, this enables moisture to transfer from the outgoing streams to the ingoing streams.

Thus, humidity or moisture is transferred from the outgoing or discharged oxidant stream through a polymer membrane or the like to a dry, counter-flowing incoming fuel stream. Simultaneously, the outgoing, humid fuel stream transfers water through another membrane to the incoming, dry oxidant stream.

The two membranes are provided in respective cells, or stacks of cells, identified as a fuel humidification cell stack and an oxidant humidification cell stack. It is also proposed to provide the fuel humidification cell stack and the oxidant humidification cell stack at either end of the fuel cell stack. As noted, it has been realized that a common problem with many fuel cell stacks is that cells at or near the end of the fuel cell stack often function at poor efficiency and often become flooded with water. This is because they do not operate at a sufficiently high temperature to cause excess water to be discharged as water vapor.

The inventors have realized that by mounting the humidification cell stacks at either end of the convention fuel cell stack, this can help stabilize the temperature of the entire fuel cell stack, and in effect ensure that all of the individual fuel cells are operating at substantially the same temperature, so as to overcome this problem. Additionally, by providing humidification cells or cell stacks on both ends of the power generation cell stack, the water is recovered before it hits the power generation cells.

BRIEF DESCRIPTION OF THE DRAWING FIGURES

Figure 2:
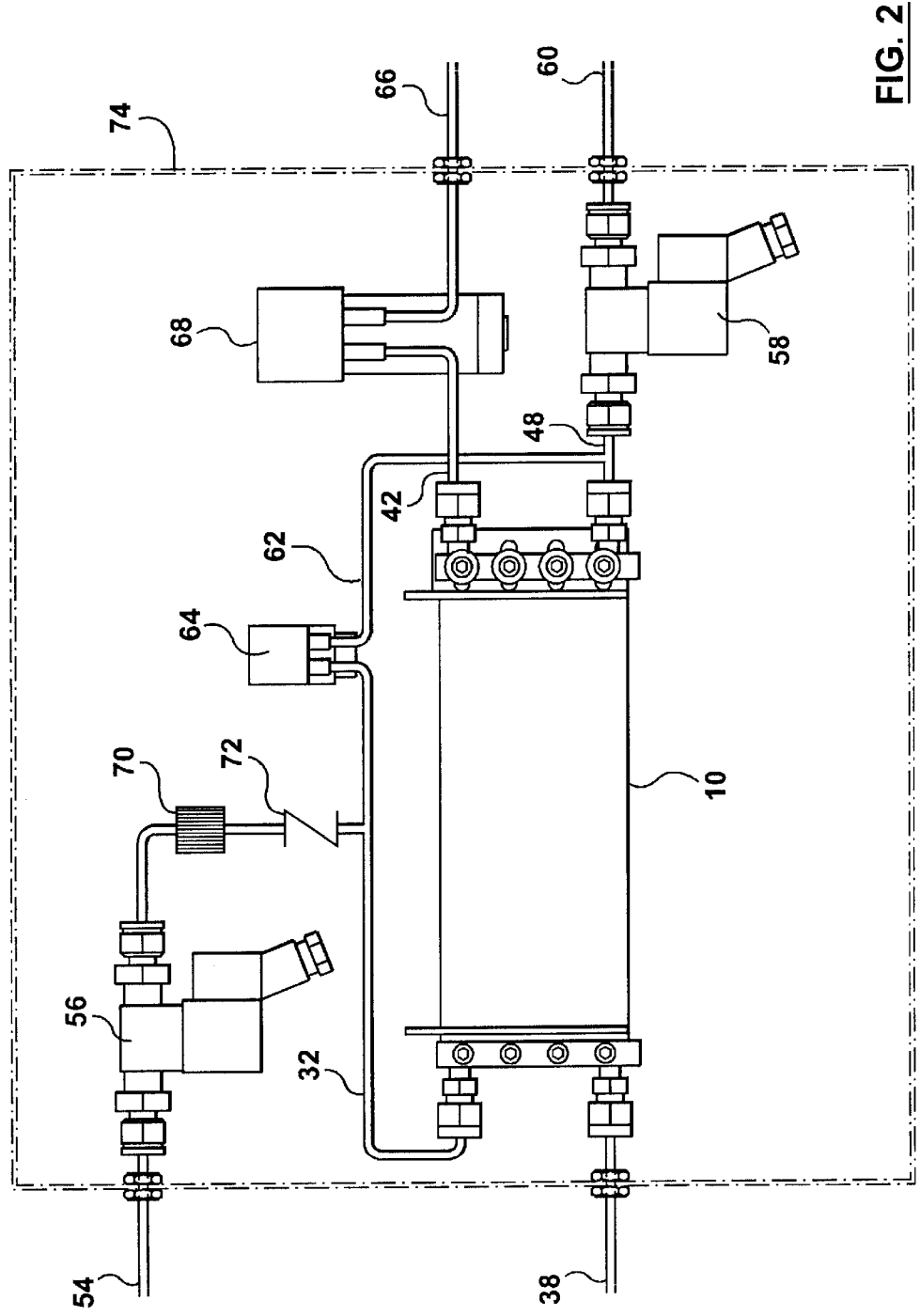

For a better understanding of the present invention, and to show more clearly how it may be carried into effect, reference will now be made, by way of example, to the accompanying drawings which show a preferred embodiment of the present invention and in which:

FIG. 1 is a schematic view of a fuel cell stack including humidification cell stacks in accordance with the present invention; and FIG. 2 is a view of the fuel cell stack of FIG. 1, with associated components shown in greater detail.

DESCRIPTION OF THE PREFERRED EMBODIMENT

FIG. 1 shows, schematically, a cell stack 10 including end plates 11, 12, holding the stack together, in a known manner. Conventional details of the individual cells are omitted. It will be understood that each fuel cell includes a plate defining oxidant flow fields or channels, and a plate defining fuel flow fields or channels. The channels would be separated by a Proton Exchange Membrane (PEM), which would be provided with an anode and a cathode in known manner. Current collectors 13, 14 are connected to each fuel cell, again as is conventional. Additionally, cooling channels would be provided. The central stack of fuel cells is indicated at 20, and includes oxidant flow fields or channels 21 and fuel flow fields or channels 22.

The central stack 20 has, for the oxidant flow, a humidified oxidant inlet 24 and an oxidant outlet 25. For the fuel side, there is a humidified fuel inlet 26 and a fuel discharge 27.

At a first end of the cell stack, there is a first or fuel humidification cell stack 30. This cell stack 30 includes a plurality of individual cells. A main fuel inlet 32 is connected to the individual cells, and fuel flows through fuel flow fields or channels 33 in the individual cells to a humidified fuel outlet 34, connected to the humidified fuel inlet 26.

The fuel flow fields or channels 33 are separated from oxidant flow fields 35 by a suitable membrane element (not shown) in each cell. The oxidant flow fields or channels 35, on the other side of the membranes, are connected to a common discharged oxidant inlet 36. The discharged oxidant inlet 36 in turn is connected to the oxidant outlet or discharge 25, connected to the oxidant flow fields 21 of the fuel cell stack. A main oxidant outlet 38 is provided for discharged oxidant and is connected to the oxidant flow fields or channels 35. The fuel flow fields or channels 33 are connected by the humidified fuel outlet 34, to the humidified fuel inlet 26 of the fuel cell stack 20.

Consequently, in use, oxidant discharged from the fuel cell stack passes through the oxidant flow fields or channels 35 and moisture in the oxidant flow passes through the membranes into the fuel flow fields or channels 33. Thus, incoming fuel from the fuel inlet 32 is humidified as it passes over the membranes in the fuel humidification cell stack 30, and humidified fuel then flows through to the main power generation cell stack 20.

Correspondingly, at the other end of the cell stack, there is a second or oxidant humidification stack 40 of oxidant humidification cells. Discharged fuel from the fuel flow fields or channels 22 passes through to a common fuel discharge 27 to a discharged fuel inlet 46 of the humidification cell stack 40. Fuel then flows from the discharged fuel inlet 46 into fuel flow fields or channels 45. These fuel channels 45 are then connected to a main fuel outlet 48 for discharged fuel.

The fuel flow fields or channels 45 are separated from oxidant flow fields or channels 43 by membranes (again not shown), as for the other humidification cell stack. A main oxidant inlet 42, for an incoming oxidant, commonly pure oxygen or air, is connected to the oxidant flow fields or channels 43, which in turn are connected to a common humidified oxidant outlet 44. This humidified oxidant outlet 44 is connected to a humidified oxidant inlet 24 of the fuel cell stack 20, which in turn is connected to the oxidant flow fields or channels 21 of the main fuel cell stack 20.

Membranes (not shown) separate the oxidant and fuel flow fields or channels 43, 45. These membranes are selected to permit passage of moisture therethrough, so that moisture from the discharged fuel stream can transfer to the incoming oxidant stream. The membranes in the humidification sections 30, 40 can be the same as the membranes in the cells of the fuel cell stack 20. In the humidification section 30, 40, no electrodes are provided, so that no proton exchange occurs and there is no electrochemical reactions Rather, the membranes simply serve to enable moisture to transfer from one stream to another.

End plates 11, 12 are provided to secure the whole assembly together. In this manner, the end plates 11, 12 would be pressed together, to secure all the elements of the various cell stacks together.

FIG. 1 also shows flow control valves to complete the apparatus. A first fuel inlet 54 is connected by solenoid control valve 56 to the main fuel inlet 32. At the fuel outlet, the main fuel outlet 48 is connected through a further solenoid valve 58 to a final fuel outlet or vent 60. Fuel can either be simply vented at outlet 60 or recovered for further use/processing on the air side, a main air inlet 66 is connected via a pump 68 to the main oxidant inlet 42.

A recirculation line 62 is provided with a pump 64 for recirculating fuel through the cell stack. In use, the valve 58 can be usually closed, so that the stack operates in a closed-ended mode. Then, fuel supplied to the stack through the main fuel inlet 32 simply makes up for fuel consumed in the fuel cell. As is known, contaminants in the fuel can build up over a period of time. For this reason, the solenoid valve 58 can be opened periodically to vent or purge fuel circulating through the cell which is heavily diluted with contaminants.

FIG. 2 shows the apparatus of FIG. 1 in more detail, and in particular shows the overall configuration of the cell stack 10, and associated components. Additionally, FIG. 2 shows an external housing 24, a flash arrestor 70 and a non-return valve 22.

While the invention has been described with moisture interchange between the oxidant stream and the fuel stream, either from the discharged oxidant stream to the incoming fuel stream or from the discharged fuel stream to the incoming oxidant stream, other combinations of flows are possible. For example, it is possible that the discharged fuel stream could transfer moisture to the incoming fuel stream. Similarly, it is possible that the discharged oxidant stream could transfer moisture to the incoming oxidant stream. This combination of flow could be provided by an alternative configuration in which the incoming oxidant stream flows counter-flow to the outgoing oxidant stream, and, simultaneously, the incoming fuel stream flows counter-flow to the outgoing fuel stream. These latter two possibilities have the attraction that mass and volume flows for the two streams would then be similar, facilitating exchange of moisture, whereas the mass and volume flows as between the oxidant and fuel streams can be quite different, particularly where ambient air is used as the oxidant stream.

Additionally, while incoming and outgoing streams have been shown as countercurrent, it is possible that the two streams could be flowing in the same direction through a humidification section. However, countercurrent streams are expected to provide better efficiency in terms of moisture exchange.

What is claimed is:

1. A cell stack comprising:

a fuel cell stack including at least one fuel cell, a humidified oxidant inlet, an oxidant discharge, a humidified fuel inlet, and a fuel discharge;

a first humidification cell stack, including at least one cell provided with a moisture exchange membrane and comprising: a discharged oxidant inlet connected to the oxidant discharge, a humidified fuel outlet connected to the humidified fuel inlet, a main fuel inlet and a main oxidant outlet, wherein each humidification cell includes oxidant flow channels connected between the discharged oxidant inlet and the main oxidant outlet and fuel flow channels connected between the main fuel inlet and the humidified fuel outlet and a moisture exchange membrane separating the oxidant and fuel flow channels, thereby to permit transfer of moisture from humidified oxidant discharged from the fuel cell stack and to dry, incoming fuel flowing to the fuel cell stack; and a second humidification cell stack including at least one humidification cell provided with a moisture exchange membrane and comprising: a main oxidant inlet, a humidified oxidant outlet connected to the humidified oxidant inlet, a discharged fuel inlet connected to the fuel discharge and a main fuel outlet, wherein each cell therein comprises oxidant flow channels connected between the main oxidant inlet and the humidified oxidant outlet and fuel flow channels connected between the discharged fuel inlet and the main fuel outlet and a moisture exchange membrane separating the oxidant and fuel flow channels, thereby to permit transfer of moisture from the discharged fuel from the fuel cell stack and to dry, incoming oxidant flowing to the fuel cell stack;

wherein the first and second humidification cell stacks are provided at opposite ends of the fuel cell stack to insulate the opposite ends of the fuel cell stack from the external environment.

2. A cell stack as claimed in claim 1, wherein the fuel cell stack includes a first end cell at a first end thereof and a second end cell at a second end thereof;

the first humidification cell stack is mounted beside and substantially parallel to the first end cell to insulate the first end cell; and, the second humidification cell stack is mounted beside and substantially parallel to the second end cell to insulate the second end cell.

3. A cell stack as claimed in claim 1, further comprising end plates for securing the first and second humidification cell stacks to the fuel cell stack.

4. A method of humidifying an incoming oxidant stream, and an incoming fuel stream supplied to a fuel cell stack having a least one fuel cell, the method comprising:

a) insulating a first end of the fuel cell stack by providing a first humidification cell at the first end of the fuel cell stack;

b) insulating a second end of the fuel cell stack by providing a second humidification cell at the second end of the fuel cell stack;

c) passing an incoming stream, selected from the incoming fuel stream and the incoming oxidant stream through the first humidification cell and passing one discharge stream, selected from the discharge fuel stream or the discharge oxidant stream through the first humidification cell, whereby moisture is transferred from said one discharge stream to said one incoming stream; and d) passing the other stream of the incoming fuel stream and the incoming oxygen stream through the second humidification cell and passing the other stream of the discharge fuel stream and the discharge oxygen stream through the second humidification cell, whereby moisture is transferred from said other discharge stream to said other incoming stream.

5. A method as claimed in claim 4, wherein step (c) comprises selecting the incoming fuel stream as said one incoming stream and the discharge stream as said one discharge stream.

6. A method as claimed in claim 4, wherein step (c) comprises selecting the incoming oxidant stream as said one incoming stream and the discharge fuel stream as said one discharge stream.

7. A method as claimed in claim 4, wherein step (c) comprises selecting the incoming fuel stream as said one incoming stream and the discharge fuel stream as said one discharge stream.

8. A method as claimed in claim 4, wherein step (c) comprises selecting the incoming oxidant stream as said one incoming stream and the discharge oxidant stream as said one discharge stream.

9. A cell stack as defined in claim 1 further comprising a fuel recirculation line for recirculating at least a portion of the fuel exhaust from the main fuel outlet to the main fuel inlet.

10. A method as claimed in claim 4, further comprising recirculating at least a portion of the discharged fuel stream back to the incoming fuel stream after the discharged fuel stream exchanges moisture with the incoming oxidant stream.

11. A cell stack comprising;

a fuel cell stack including at least one fuel cell, a humidified oxidant inlet, an oxidant discharge, a humidified fuel inlet, and a fuel discharge;

a first humidification cell stack, including at least one cell provided with a moisture exchange membrane and comprising: a discharged oxidant inlet connected to the oxidant discharge, a humidified oxidant outlet connected to the humidified oxidant inlet, a main oxidant inlet and a main oxidant outlet, wherein each humidification cell includes first oxidant flow channels connected between the discharged oxidant inlet and the main oxidant outlet and second oxidant flow channels connected between the main oxidant inlet and the humidified oxidant outlet and a moisture exchange membrane separating the first and second oxidant flow channels, thereby to permit transfer of moisture from humidified oxidant discharged from the fuel cell stack to the dry, incoming oxidant flowing to the fuel cell stack; and a second humidification cell stack including at least one humidification cell provided with a moisture exchange membrane and comprising: a main fuel inlet, a humidified fuel outlet connected to the humidified fuel inlet, a discharged fuel inlet connected to the fuel discharge and a main fuel outlet, wherein each cell therein comprises first fuel flow channels connected between the main fuel inlet and the humidified fuel outlet and second fuel flow channels connected between the discharged fuel inlet and the main fuel outlet and a moisture exchange membrane separating the first and second fuel flow channels, thereby to permit transfer of moisture from the discharged fuel from the fuel cell stack to the dry, incoming fuel flowing to the fuel cell sack;

wherein the first and second humidification cell stacks are provided at opposite ends of the fuel cell stack to insulate the opposite ends of the fuel cell stack from the external environment.

12. A cell stack as claimed in claim 11, wherein the fuel cell stack includes a first end cell at a first end thereof and a second end cell at a second end thereof;

the first humidification cell stack is mounted beside and substantially parallel to the first end cell to insulate the first end cell; and, the second humidification cell stack is mounted beside and substantially parallel to the second end cell to insulate the second end cell.

13. A cell stack as claimed in claim 11, further comprising end plates for securing the first and second humidification cell stacks to the fuel cell stack.

* * * * *